United States Patent
Adde et al.

(10) Patent No.: US 7,125,227 B2
(45) Date of Patent: Oct. 24, 2006

(54) PROCESS FOR MANUFACTURING OR REPAIRING A MONOBLOC BLADED DISC

(75) Inventors: Danielle Adde, Cesson (FR); Marie-France Bourgeois, Rognes (FR); Patrick Lestoille, Fontainebleau (FR); Jean-Pierre Ferte, Corbeil-Essonnes (FR); Francis Soniak, Bures sur Yvette (FR); Gérard Miraucourt, Brie Comte Robert (FR)

(73) Assignee: Snecma Moteurs, Paris (FR)

( * ) Notice: Subject to any disclaimer, the term of this patent is extended or adjusted under 35 U.S.C. 154(b) by 60 days.

(21) Appl. No.: 10/937,391

(22) Filed: Sep. 10, 2004

(65) Prior Publication Data

US 2005/0098608 A1      May 12, 2005

(30) Foreign Application Priority Data

Sep. 19, 2003   (FR) .................................. 03 50578

(51) Int. Cl.
- *F01D 5/30* (2006.01)
- *B23K 20/12* (2006.01)
- *B23P 6/00* (2006.01)

(52) U.S. Cl. ............... 416/213 R; 416/234; 29/402.08; 29/402.13; 29/889.1; 29/889.21; 228/112.1; 228/114; 228/119

(58) Field of Classification Search ........... 416/213 R, 416/213 A, 234; 228/112.1, 114, 119; 29/402.08, 29/402.13, 889.1, 889.21
See application file for complete search history.

(56) References Cited

U.S. PATENT DOCUMENTS

| | | | | |
|---|---|---|---|---|
| 4,883,216 A | * | 11/1989 | Patsfall | 228/119 |
| 5,492,581 A | * | 2/1996 | Searle | 228/112.1 |
| 5,865,364 A | * | 2/1999 | Trask et al. | 228/112.1 |
| 6,595,401 B1 | * | 7/2003 | Collot et al. | 228/112.1 |
| 6,688,512 B1 | * | 2/2004 | Trask | 228/112.1 |

FOREIGN PATENT DOCUMENTS

| | | |
|---|---|---|
| EP | 0 458 630 | 11/1991 |
| EP | 0 850 718 | 7/1998 |
| EP | 0 887 143 | 12/1998 |

* cited by examiner

*Primary Examiner*—Christopher Verdier
(74) *Attorney, Agent, or Firm*—Oblon, Spivak, McClelland, Maier & Neustadt, P.C.

(57) ABSTRACT

A monobloc bladed disc and a process for manufacturing or repairing a monobloc bladed disc, where the process includes forming, on a protruding projection belonging to a disc and extending from an upstream end to a downstream end along a protruding projection chord, a welded joint surface intended to allow a subsequent stage of fitting a blade by linear friction welding onto the protruding projection of the disc. The forming the welded joint surface is carried out in such a way that it includes at least two butt-jointed plane portions arranged in sequence along the protruding projection chord.

17 Claims, 3 Drawing Sheets

PROCESS FOR MANUFACTURING OR REPAIRING A MONOBLOC BLADED DISC

TECHNICAL FIELD

The present invention relates in a general way to a process for manufacturing or repairing a monobloc bladed disc including the formation of a welded joint surface on a projection protruding from a disc, this welded joint surface being intended to allow a subsequent fitting of a blade by linear friction welding onto this same protruding projection.

Furthermore, the invention also relates to a disc for a monobloc bladed disc comprising at least one protruding projection onto which such a welded joint surface is provided.

The invention applies most particularly but not exclusively to the field of turboshaft engine rotors.

PRIOR ART

In some turboshaft engine rotors, use is made of monobloc bladed discs, in other words rotor portions to which rotating blade stages are rigidly joined for example by linear friction welding, unlike the conventional design wherein blade roots with a cross-section that is bulb-shaped, fantail-shaped or of some other shape of the same type, are slid into disc grooves of complementary cross-section. In a known and advantageous way, monobloc bladed discs are on the whole lighter, which explains why they may be preferred.

To manufacture a monobloc bladed disc, the first operation is to manufacture the disc itself. This is done particularly by providing a plurality of protruding projections projecting from a vein of the disc, corresponding to a peripheral surface of the latter.

When manufacturing this disc, a stage of forming a welded joint surface is implemented on each protruding projection, this surface extending from an upstream end to a downstream end along a protruding projection chord, and being intended to allow a subsequent stage of fitting a blade by linear friction welding onto this same protruding projection. Additionally, it is specified that this blade has a complementary welded joint surface, intended to conform in shape to the welded joint surface of the protruding projection, during the course of the stage of fitting by linear friction welding.

To carry out this stage of forming the welded joint surface on the protruding projection, several solutions have been proposed in the prior art.

Indeed the initial proposal was to provide a plane welded joint surface, for example parallel to an axial direction of the disc and to a tangential direction of this disc.

Admittedly, in this respect, even if the fact of providing a plane and single surface makes it particularly easy to implement the surface forming stage, this solution is still nonetheless relatively restricting, for one essential reason which will be explained hereinafter.

Actually, discs usually have a vein of relatively complex geometry, which takes the form of a line that is curved in axial cross-section. By way of illustration, the veins of discs encountered in the prior art often take the form of a concave surface.

Yet in a typical and known way, when the manufacture of the monobloc bladed disc is finished, the blade is connected to the vein of the disc by means of a connecting radius. The connecting radius therefore corresponds to a projection of material provided between the blade and the vein, and extends in a substantially consistent way all along it. Admittedly this connecting radius is at least partially formed by the projection initially provided on the disc.

Consequently, given the usually complex geometry of the vein, it is obvious that the fact of providing a single and plane welded joint surface almost of necessity involves a protruding projection that is designed with the intention of constituting not only the connecting radius, but also a part of the blade. In other words, by providing a plane welded joint surface, it is impossible to follow the profile of the vein of complex geometry correctly, with the result that at least one part of the welded joint surface must then perforce be made outside the future connecting radius or in a narrow portion of it. This obviously renders the implementation of the stage of fitting the blade by linear friction welding relatively tricky, on account of the small contact surface between the two components to be welded. Moreover, in such circumstances, the welded joint obtained then necessarily includes a relatively thin portion which significantly lessens the blade holding rigidity of the disc.

In the document EP 0 887 143 A, the proposal was made to make a welded joint surface parallel to the vein of the disc of complex geometry, and straight in the tangential direction of the disc in order to allow the blade to be fitted by linear friction welding onto the protruding projection.

However the complex three-dimensional form of this welded joint surface is extremely difficult to achieve by machining, with the result that this solution is not totally satisfactory either.

Moreover, it is pointed out that the two prior art solutions outlined above apply not only to the manufacture of a monobloc bladed disc, but also when a repair is involved consisting in replacing one or more blades of this bladed disc.

Naturally, during such a repair process, the drawbacks relating to the various solutions indicated above recur in the same way as during the manufacture of this same monobloc bladed disc.

DISCLOSURE OF THE INVENTION

The purpose of the invention is therefore to propose a process for manufacturing or repairing a monobloc bladed disc including the formation of a welded joint surface on a protruding projection of a disc, the process overcoming at least partially the drawbacks mentioned above in relation to the prior art embodiments.

On the other hand, another purpose of the invention is to propose a disc for a monobloc bladed disc comprising at least one protruding projection, on which a welded joint surface is provided formed according to the process fulfilling the purpose mentioned above.

On the other hand, the purpose of the invention is to propose a monobloc bladed disc comprising at least one protruding projection extending from an upstream end to a downstream end along a protruding projection chord, and on which a welded joint surface is provided that is intended to allow a blade to be fitted by linear friction welding onto the protruding projection of the disc. According to the invention, for at least one protruding projection, the welded joint surface includes at least two butt-jointed plane portions, arranged one after the other along the protruding projection chord.

To advantage, by virtue of the specific shape of the welded joint surface of the protruding projection, its formation is much faster and easier to achieve than that described in the document EP 0 887 143 A, which means as a result that the costs of implementing such a process of monobloc bladed disc manufacture or repair can be reduced.

Moreover, given the fact that at least two portions are provided, plane and butt-jointed and therefore inclined relative to each other, it is therefore easy to form the welded joint surface as close as possible to the vein of the disc, unlike the prior art solution relating to the single plane welded joint surface. To this end, it is specified that by following the working surface of the disc as close as possible, the welded joint surface can easily be provided in such a way as to be wholly at the level of a future connecting radius between the vein and the blade concerned. In other words, the welded joint obtained following the stage of fitting the blade by linear friction welding can easily be entirely at the level of the connecting radius located between the two components.

Consequently, since the welded joint surface can to advantage be deprived of a relatively thin part, it is well understood that the implementation of the stage of fitting the blade by linear friction welding is made easier relative to that encountered in the first prior art solution described, and that the welded joint obtained naturally achieves improved blade holding relative to the disc.

Additionally, the presence of butt-jointed plane portions, connected to each other by intersections taking the form of parallel straight lines, makes it possible to achieve an accurate positioning of the blade relative to the protruding projection, and to reduce considerably the risks of unwanted displacements of this blade during the stage of fitting by linear friction welding. This is explained by the fact that the blade is held firmly between the multiple plane inclined portions of the welded joint surface, and is consequently self-centred onto it.

Preferentially, the stage of forming the welded joint surface is carried out in such a way that it consists exclusively of two butt-jointed plane portions, or else that it consists exclusively of three butt-jointed plane portions. Clearly, the number of butt-jointed plane portions composing the welded joint surface could be higher, without departing from the framework of the invention. Admittedly, however, the number of two or three portions is preferred insofar as it implies that the resulting welded joint surface is relatively simple to achieve, while being capable of following the vein of the disc correctly without departing from the future connecting radius, and this is the case practically whatever the complexity of the shape of this vein.

Preferably, the stage of forming the welded joint surface is carried out in such a way that each intersection between two butt-jointed plane portions is parallel to a direction of oscillation adopted for implementing the stage of fitting the blade by linear friction welding.

To this end, the direction of oscillation adopted for implementing the stage of fitting the blade by linear friction welding is selected from among the group consisting of a tangential direction of the disc, and of all directions substantially perpendicular to the protruding projection chord, these indicative directions being naturally preferred but in no circumstances restricting.

Finally, in a relatively conventional way, the manufacturing or repair process according to the invention preferably includes a stage of forming, on a blade, a complementary welded joint surface, susceptible of conforming in shape to the welded joint surface of the protruding projection of the disc.

On the other hand, the purpose of the invention is a disc for a monobloc bladed disc comprising at least one protruding projection extending from an upstream end to a downstream end along a protruding projection chord, and on which a welded joint surface is provided that is intended to allow a blade to be fitted by linear friction welding onto the protruding projection of the disc. According to the invention, for at least one protruding projection, the welded joint surface includes at least two butt-jointed plane portions, arranged one after the other along the protruding projection chord.

Preferably, for at least one protruding projection, the welded joint surface consists exclusively of two butt-jointed plane portions, or else consists exclusively of three butt-jointed plane portions.

Moreover, in a way similar to that outlined above, it may be provided that, for at least one protruding projection, each intersection between two butt-jointed plane portions of the welded joint surface is parallel to a direction selected from among the group consisting of one tangential direction of the disc, and of all directions that are substantially perpendicular to the protruding projection chord.

Other advantages and characteristics of the invention will emerge in the detailed non-restrictive description given below.

BRIEF DESCRIPTION OF THE DRAWINGS

This description will be given in conjunction with the appended drawings in which.

DETAILED DISCLOSURE OF PREFERRED EMBODIMENTS

Figure 1:
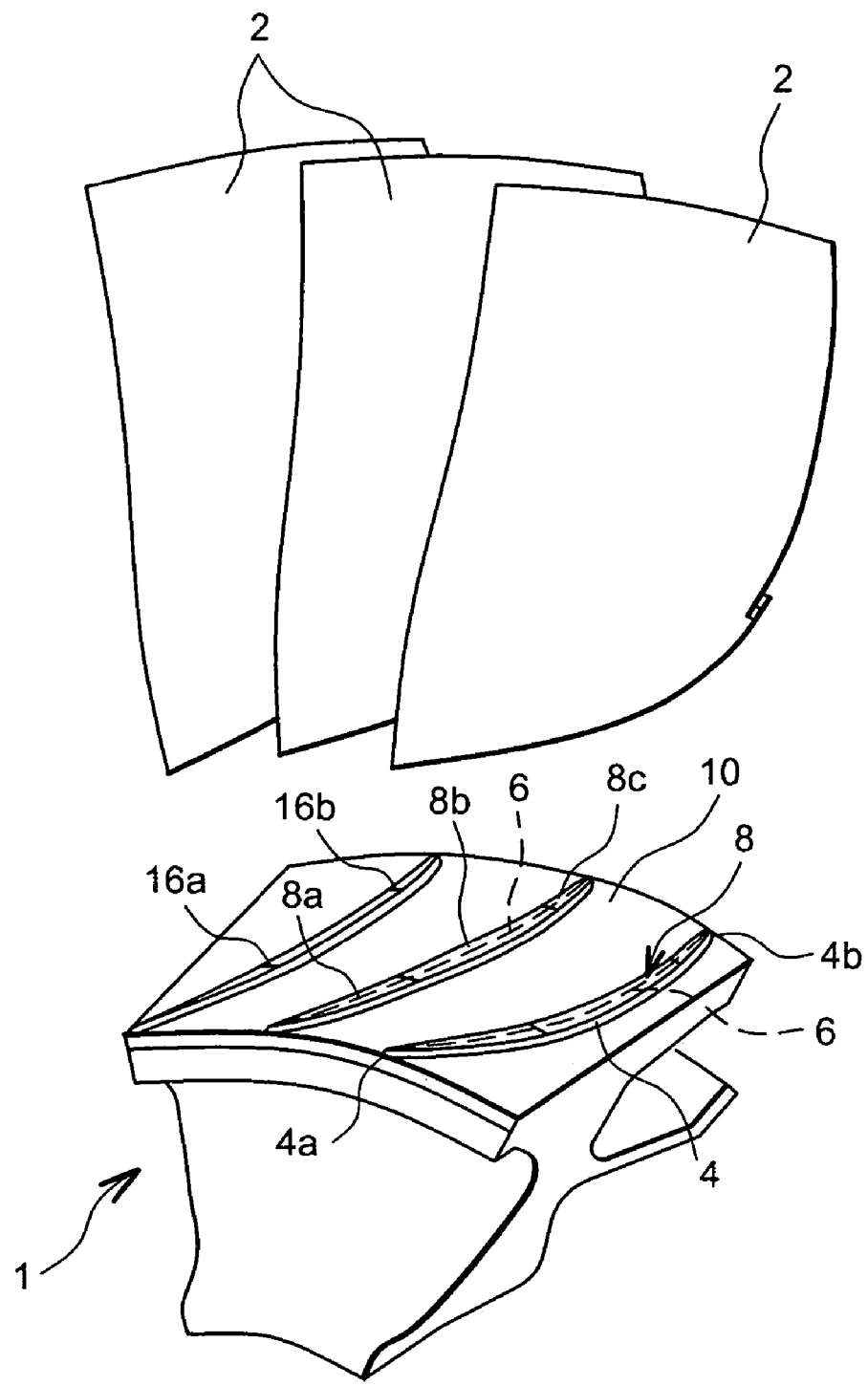
FIG. 1 shows a partial perspective view of a disc and of a plurality of blades intended to constitute a monobloc bladed disc, after the stage of forming the welded joint surface of the manufacturing or repair process implemented according to a first preferred embodiment of the present invention.

With reference to FIG. 1, a disc 1 and a plurality of blades 2 can be seen that are intended to constitute a monobloc bladed disc, preferably to be fitted to a turboshaft engine rotor. In this figure, the disc 1 is shown in a state in which it is found following the completion of a stage of forming a welded joint surface in the manufacturing or repair process implemented according to a first preferred embodiment of the present invention.

As can be seen in this FIG. 1, the disc 1, also part of the subject matter of the present invention, includes a plurality of protruding projections 4 each extending from an upstream end 4a to a downstream end 4b other along a protruding projection chord 6. It is noted that the upstream and downstream ends 4a and 4b of a protruding projection 4 correspond to the leading edge and the trailing edge respectively of this same protruding projection 4.

In a known way, each protruding projection 4 is intended to constitute an anchoring support for an associated blade 2, the stage of fitting the latter onto the protruding projection 4 being carried out by linear friction welding.

To this end, on each protruding projection 4, there is actually a process applied of forming a welded joint surface 8, onto which the blade 2 will be welded by linear friction.

In this first preferred embodiment of the present invention, for each projection 4, the welded joint surface 8 consists of three butt-jointed plane portions 8a, 8b, 8c, which extend one after the other from the upstream end 4a to the downstream end 4b, along the protruding projection chord 6.

In this way, as can be seen in FIG. 1, the welded joint surface 8 can follow as close as possible the vein 10 of the disc 1, which here has a substantially concave shape, and which is more generally known as "hollow vein".

Figure 2:
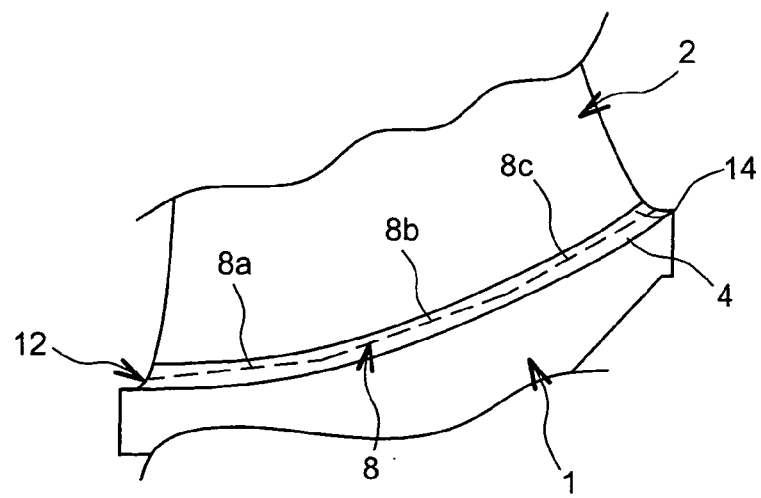
FIG. 2 shows a partial axial cross-section view of the monobloc bladed disc obtained following the completion of the manufacturing or repair process according to the first preferred embodiment of the present invention.

With reference to FIG. 2, the monobloc bladed disc can be seen that is obtained following the completion of the manufacturing or repair process according to the first preferred embodiment of the present invention.

As can clearly be seen in this figure and as has been shown above in the prior art, the blade 2 is connected to the disc 1 by means of a connecting radius 12 also extending along the protruding projection chord 6.

It is noted that the welded joint surface 8 initially provided on the projection 4 is shown in dotted lines in FIG. 2 by way of indication, but that these dotted lines also show the location of a welded joint obtained following the completion of the stage of fitting the blade 2 onto the protruding projection 4 by linear friction welding.

Given that this welded joint surface 8 may have been made as close as possible to the vein 10 implies that the welded joint obtained is located, to great advantage, wholly in the connecting radius 12. In other words, when the monobloc bladed disc is in its final state as shown, the protruding projection 4 initially provided on the disc 1 constitutes only one lower radial portion of the connecting radius 12, whereas an upper radial portion 14 consists of material coming from the blade 2, and separated from the protruding projection 4 by the welding bead obtained.

Naturally, in the event of the vein 10 having an even more complex shape than the one shown, the number of butt-jointed plane portions 8a, 8b, 8c could be increased so that the welded joint surface 8 adapts correctly to the working surface 10, and so that it is again wholly located at the level of a future connecting radius between the blade 2 and the disc 1.

Figure 3:
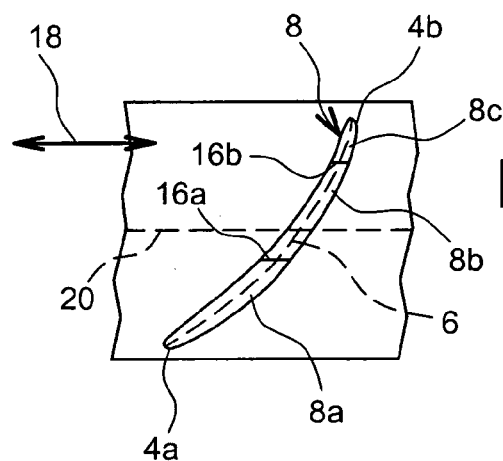
FIG. 3 shows a view from above of the disc shown in FIG. 1.

With reference to FIG. 3, it can be seen that the three butt-jointed plane portions 8a 8b, 8c are connected to each other by intersections 16a and 16b having the form of straight lines parallel to each other, and also parallel to a direction of oscillation adopted for implementing the stage of fitting the blade 2 by linear friction welding, this oscillation direction being shown diagrammatically by the arrow 18.

In this first variant of the first preferred embodiment of the invention, the welded joint surface 8 has been formed in such a way that these intersections 16a and 16b are parallel to a tangential direction of the disc 1, shown diagrammatically by the dotted line 20.

Consequently, given the holding of the blade 2 between the plane portions 8a, 8b, 8c during the stage of linear friction welding of this blade, it is well understood that the dangers of radial movements of the blade 2, during this stage, are to advantage totally set aside.

Figure 4:
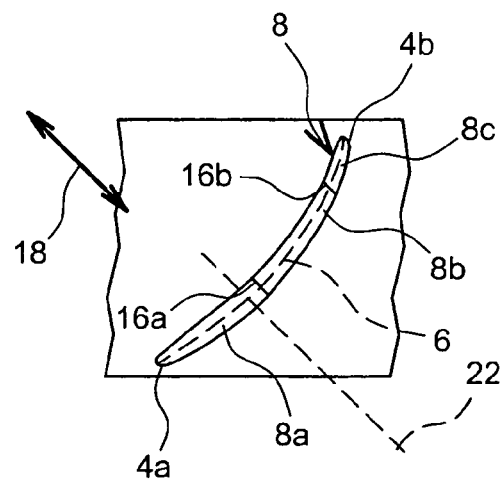
FIG. 4 shows a view similar to that in FIG. 3, when the manufacturing or repair process is implemented according to a variant of the first preferred embodiment of the present invention.

As is shown in FIG. 4 which shows a second variant of the first preferred embodiment of the invention, the intersections 16a and 16b can be orientated in another direction, for example in all directions substantially perpendicular locally to the chord 6 of the protruding projection 4.

This is in fact the example shown in this FIG. 4, where the intersections 16a and 16b are parallel to a direction 22 perpendicular locally to a part of the protruding projection chord 6 which is in proximity to the upstream end 4a of the protruding projection 4. Moreover, these intersections 16a and 16b are also naturally parallel to the direction of oscillation 18 adopted for the implementation of the stage of fitting the blade 2 by linear friction welding, which therefore differs in this second variant from a direction parallel to the tangential direction of the disc 1.

By way of example, the plane portions 8a, 8b, 8c butt-jointed by intersections 16a and 16b and arranged one after the other along the protruding projection chord 6 can define, two by two, an angle of about 15°.

Figure 5:
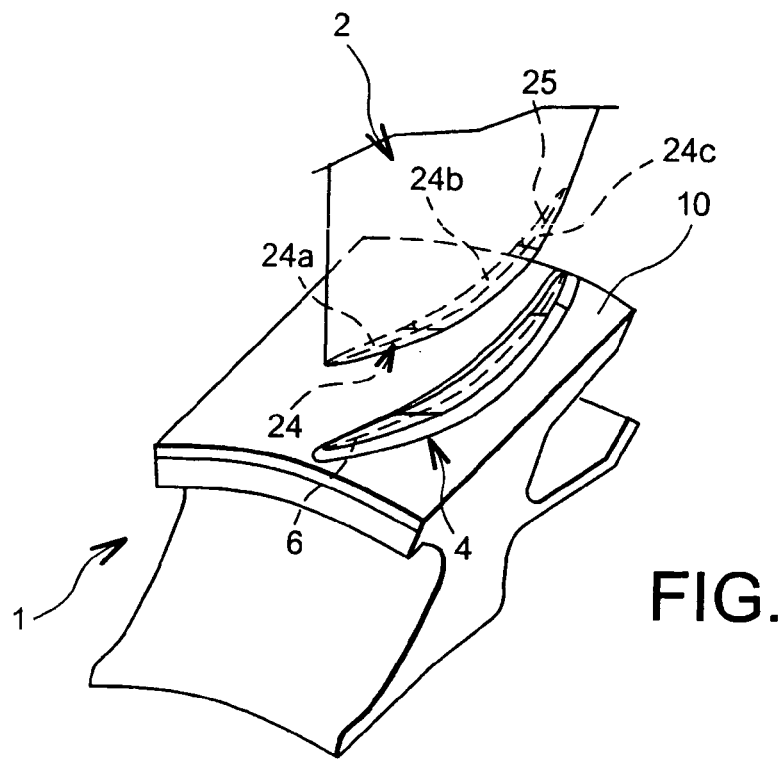
FIG. 5 shows a partial view on a larger scale of the view shown in FIG. 1.

In the manufacturing or repair process according to the first preferred embodiment of the present invention, there is provided a stage of forming, on each blade 2 intended to be anchored to the disc 1, a complementary welded joint surface 24 shown in FIG. 5.

Clearly and as may be imagined from its definition, this surface 24 is complementary to the welded joint surface 8 provided on the associated protruding projection 4, for the purpose of obtaining a perfect contact between the blade 2 and this same projection 4 during the stage of fitting by linear friction welding.

In this way, the surface 24 consists, one after the other along a blade chord 25, of three butt-jointed plane portions 24a, 24b, 24c, identical respectively to the butt-jointed plane portions 8a, 8b, 8c of the protruding projection 4 with which the blade 2 is associated.

It is noted that in this FIG. 5, the blade 2 is shown only by way of illustration, but that it has in fact preferentially a lower portion of much higher volume than the rest of the blade on which the complementary surface 24 is actually provided, which is done for the purpose of allowing the stage of fitting the blade 2 by linear friction to operate properly.

Figure 6:
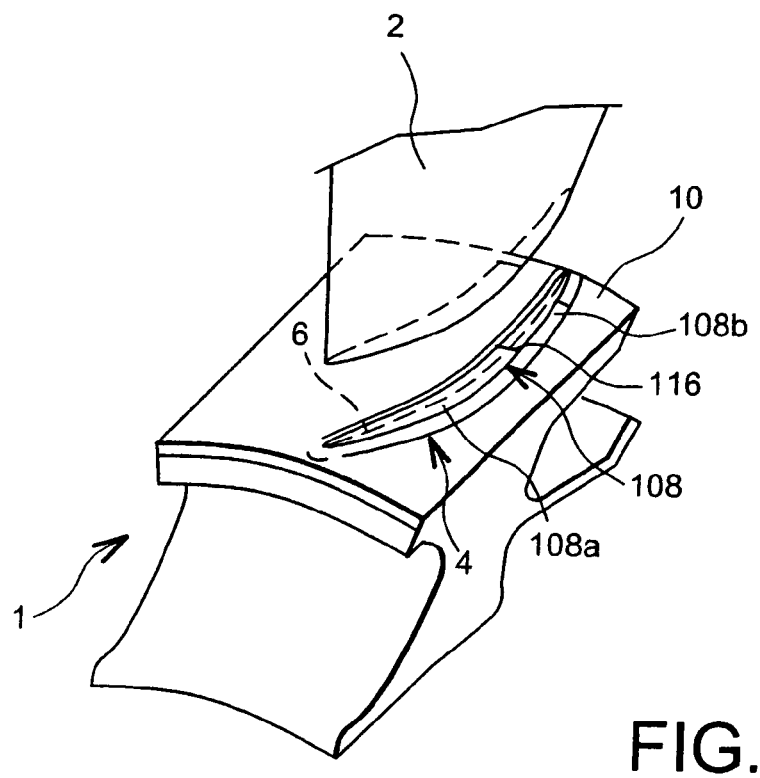
FIG. 6 shows a view similar to that in FIG. 5, when the manufacturing or repair process is implemented according to a second preferred embodiment of the invention.

Finally, with reference to FIG. 6, a disc 1 can be seen and a blade 2 intended to be fitted onto it in order to make a monobloc bladed disc, the disc 1 being shown in a state in which it finds itself following the completion of a stage of forming a welded joint surface in the manufacturing or repair process implemented according to a second preferred embodiment of the present invention.

The main difference relative to the first preferred embodiment lies in the fact that the welded joint surface 108 is formed in such a way as to have only two butt-jointed plane portions 108a and 108b, still arranged one after the other along the protruding projection chord 6.

Naturally, this embodiment is possible when the vein 10 and the disc 1 has a shape of no great complexity, the main objective still being that this surface 108 is provided in such a way as to be wholly at the level of a future connecting radius between the vein 10 and the blade 2 concerned.

Here again, the single intersection 116 located between the plane portions 108a and 108b is parallel to the direction of oscillation (not shown in this figure) adopted for the implementation of the stage of fitting the blade 2 by linear friction welding.

Finally, it is pointed out that the various preferred embodiments described above apply irrespectively to the manufacture and to the repair of a monobloc bladed disc.

Clearly, various modifications can be made by the man skilled in the art to the processes and to the discs 1 which have just been described, solely by way of example and non-respectively.

The invention claimed is:

1. A process for manufacturing or repairing a monobloc bladed disc comprising:

forming, on a protruding projection belonging to a disc and extending from an upstream end to a downstream end along a protruding projection chord, a welded joint surface configured to allow a subsequent stage of fitting a blade by linear friction welding onto said protruding projection of the disc, wherein the forming the welded joint surface is carried out in such a way that it includes at least two butt-jointed plane portions inclined with respect to each other and arranged one after the other along the protruding projection chord.

2. The manufacturing or repair process according to claim 1, wherein the forming the welded joint surface is carried out in such a way that it consists exclusively of two butt-jointed plane portions.

3. The manufacturing or repair process according to claim 1, wherein the forming the welded joint surface is carried out in such a way that it consists exclusively of three butt-jointed plane portions.

4. The manufacturing or repair process according to claim 1, wherein the forming the welded joint surface is carried out in such a way that each intersection between two butt-jointed plane portions is parallel to a direction of oscillation adopted for implementing the stage of fitting the blade by linear friction welding.

5. The manufacturing or repair process according to claim 4, wherein the direction of oscillation adopted for implementing the stage of fitting the blade by linear friction welding is selected from among the group consisting of a tangential direction of the disc, and of all directions substantially perpendicular to the protruding projection chord.

6. The manufacturing or repair process according to claim 1, wherein it additionally includes forming, on a blade, a complementary welded joint surface, susceptible of conforming in shape to the welded joint surface of the protruding projection of the disc.

7. A disc for a monobloc bladed disc comprising:

at least one protruding projection extending from an upstream end to a downstream end along a protruding projection chord, and on which protruding projection a welded joint surface is provided that is configured to allow a blade to be fitted by linear friction welding onto the protruding projection of the disc, wherein for at least one protruding projection, the welded joint surface includes at least two butt-jointed plane portions inclined with respect to each other and arranged one after the other along the protruding projection chord.

8. The disc for a monobloc bladed disc according to claim 7, wherein for at least one protruding projection, the welded joint surface consists exclusively of two butt-jointed plane portions.

9. The disc for a monobloc bladed disc according to claim 7, wherein for at least one protruding projection, the welded joint surface consists exclusively of three butt-jointed plane portions.

10. The disc for a monobloc bladed disc according to claim 7, wherein for at least one protruding projection, each intersection between two butt-jointed plane portions of the welded joint surface is parallel to a direction selected from among the group consisting of one tangential direction of the disc, and of all directions that are substantially perpendicular to the protruding projection chord.

11. A turbine engine including the disc for a monobloc bladed disc according to claim 7.

12. A manufacturing or repair process including the process of claim 1, further comprising:

incorporating the monobloc bladed disc into a turbine engine.

13. A disc for a monobloc bladed disc including the disc and at least one blade, the disc comprising:

at least one projection means for receiving a blade, each projection means including a welded joint surface for welding the blade by linear friction welding onto the welded joint surface, said projection means extending from an upstream end to a downstream end along a protruding projection chord, wherein for at least one projection means, the welded joint surface includes at least two butt-jointed plane portions inclined with respect to each other and arranged one after the other along the protruding projection chord.

14. The disc for a monobloc bladed disc according to claim 13, wherein for at least one projection means, the welded joint surface consists exclusively of two butt-jointed plane portions.

15. The disc for a monobloc bladed disc according to claim 13, wherein for at least one projection means, the welded joint surface consists exclusively of three butt-jointed plane portions.

16. The disc for a monobloc bladed disc according to claim 13, wherein for at least one projection means, each intersection between two butt-jointed plane portions of the welded joint surface is parallel to a direction selected from among the group consisting of one tangential direction of the disc, and of all directions that are substantially perpendicular to the protruding projection chord.

17. A turbine engine including the disc for a monobloc bladed disc according to claim 13.

* * * * *